Figures 1, 2:
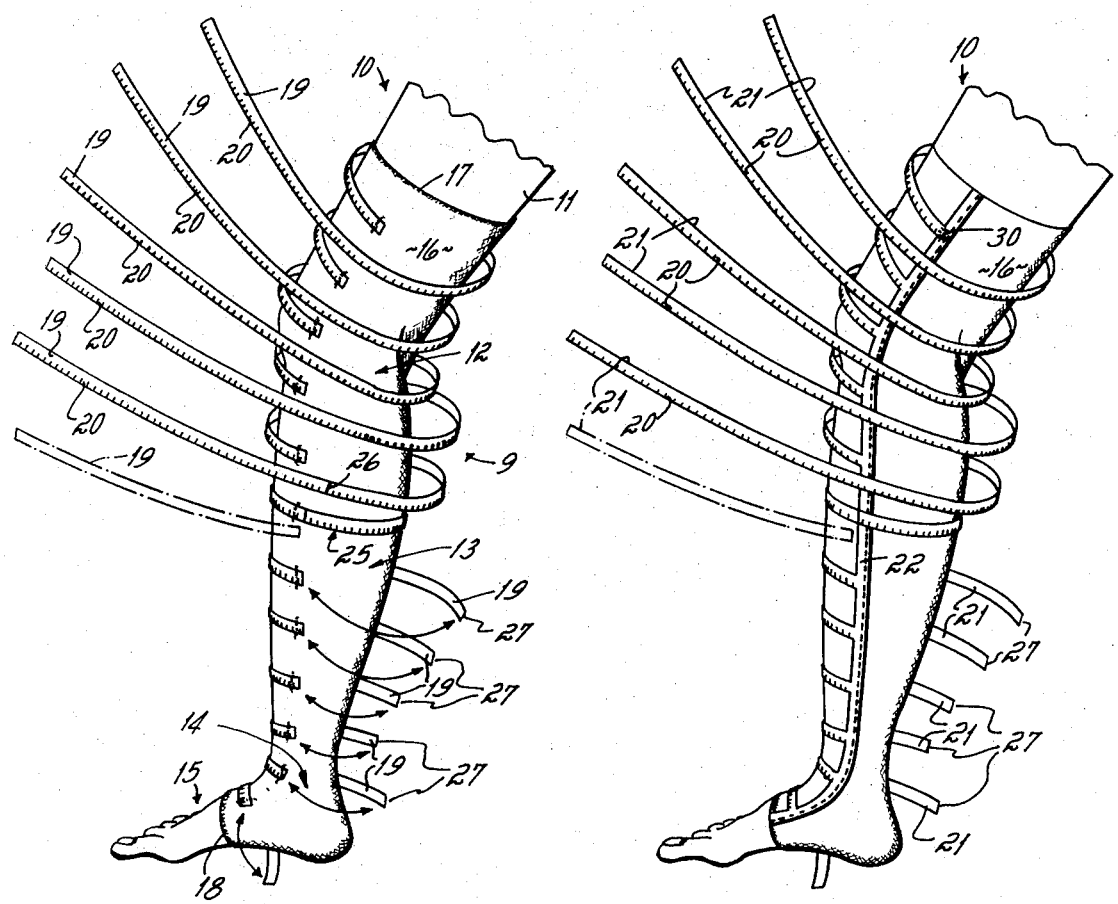

United States Patent [19]
Lewis

[11] 3,832,780
[45] Sept. 3, 1974

[54] DISPOSABLE MEASURING AND FITTING DEVICE FOR SURGICAL GARMENTS

[75] Inventor: Hector E. Lewis, Cincinnati, Ohio

[73] Assignee: Surgical Appliance Industries, Inc., Cincinnati, Ohio

[22] Filed: May 11, 1972

[21] Appl. No.: 252,483

[52] U.S. Cl.................. 33/2 R, 33/15, 33/174 D, 33/179
[51] Int. Cl........ A41h 1/02, G01b 5/08, A61b 5/10
[58] Field of Search............ 33/174 D, 15, 179, 2 R, 33/2 A, 2 H, 137 R

[56] References Cited
UNITED STATES PATENTS

| | | | |
|---|---|---|---|
| 48,644 | 7/1865 | Beard | 33/2 R |
| 899,802 | 9/1908 | Pohle | 33/2 R |
| 2,574,873 | 11/1951 | Jobst | 33/15 UX |
| 2,691,221 | 10/1954 | Jobst | 33/15 |
| 3,327,394 | 6/1967 | Tenteris | 33/2 R |
| 3,407,507 | 10/1968 | Brubaker | 33/137 R X |
| 3,694,921 | 10/1972 | Oblander | 33/15 X |

Primary Examiner—John W. Huckert
Assistant Examiner—Milton S. Gerstein
Attorney, Agent, or Firm—Wood, Herron & Evans

[57] ABSTRACT

In a body measuring apparatus for measuring and fitting surgical or therapeutic garments, an inexpensive, disposable sleeve comprising a single piece of highly elastic material designed to be placed by the patient over the portion of the body for which the garment is to be fitted. The sleeve has a plurality of spaced inelastic measuring tapes or scales attached thereto, the tapes having indicia thereon to permit the wearer or another person to wrap each tape around the sleeve and note, mark, or otherwise record the measurement of the body circumference. For ease of manufacture of the body measuring apparatus, the measuring tapes may be spaced along and extend laterally from another tape to which they are secured, this latter tape being secured longitudinally to the sleeve along its length.

6 Claims, 2 Drawing Figures

DISPOSABLE MEASURING AND FITTING DEVICE FOR SURGICAL GARMENTS

This invention relates to an improvement in a template-like device for measuring and fitting surgical or therapeutic garments.

Garments to which the improved template of this invention relates typically are in the form of stockings and comprise extremity encircling or confining sleeves constructed in a continuous tubular form from elastic material and shaped to uniquely conform to the specific shape of the wearer's body for providing therapeutically beneficial support thereto.

Numerous devices for measuring the contours of the body have been developed in the past to assist in manufacturing therapeutic supportive garments which are custom-fitted to the patient. In one such earlier developed measuring device, a skeleton model of the body being measured, e.g., a leg, is formed directly on that body. Such a device comprises a plurality of transverse strips of inelastic material which extend, at spaced intervals, perpendicularly from a longitudinal strip. In use, the longitudinal strip is placed along the length of the leg. With the longitudinal strip manually held in position by the user, the transverse members are drawn about the leg to encircle it, effectively shaping the device to conform to the contours of the leg. The transverse strips are then secured in place to the longitudinal strip with tape, adhesive or the like. Thereafter, the device is removed from the leg by cutting each transverse strip, and the transverse strips individually measured to facilitate manufacture of a therapeutic garment sized to custom-fit the leg which has been measured.

A principal disadvantage of the above measuring device stems from the overall difficulty in making the required measurements necessitated by having to manually hold the longitudinal strip in place while securing the transverse strips. Although it is possible for the wearer to make the necessary neasurements himself, such is difficult at best, and often unreliable. In most circumstances, assistance of a fitter is required. However, this often offends patients since taking of such measurements involves bodily contact, and may in certain instances, e.g., when a leg is measured, expose portions of the patient's body, such as the thigh, to the attendant, causing the patient needless embarrassment.

It has been an objective of this invention to provide a body measuring device useful in manufacturing custom-fit therapeutic garments which can be easily manipulated by the patient alone, and yet produce accurate measurements of the portion of the body being measured. This objective has been accomplished by securing transverse measuring strips of a template to an elastic sleeve in a manner such that the strips, when the sleeve is positioned about the body, can be readily encircled about the patient's body without the patient having to simultaneously hold the template in place during the strip-encircling operation. Once the sleeve is positioned about the body at the desired location, it remains in place, properly registering the strips to the body, without further attention by the patient. The patient thus has both hands free to encircle the strips about his body and secure them in place or otherwise manipulate them to measure the girth of the encircled body portion. Because the patient can readily utilize the measuring device of this invention without assistance, needless physical contact and exposure of the patient's body is eliminated.

Since the sleeve is only used to temporarily locate the template strips with respect to the body and not provide support for the body of a therapeutic nature, it can be fabricated of highly elastic material which makes putting it on and removing it a simple operation which requires little effort. Further, such a highly elastic sleeve is not likely to irritate or cause undue discomfort to a patient having an ulcerated leg or the like about which the sleeve must be positioned in the course of the measurement step. Finally, since the sleeve is highly elastic, it can be made very inexpensively, and in fact be made disposable. A disposable sleeve, since never reused, is particularly desirable by virtue of its hygienic character.

The foregoing objects, features and advantages of the present invention will become more apparent from the following more detailed description of a preferred embodiment, especially when considered in light of the accompanying drawings illustrating the invention, wherein:

FIG. 1 is a perspective view of one embodiment of the sleeve-mounted measuring template of this invention shown positioned in use about the leg of a patient; and FIG. 2 is a perspective view of another embodiment of the sleeve-mounted measuring template of this invention shown positioned in use about the leg of a patient.

Referring now to FIG. 1, a leg 10 disposed generally in a vertical or standing position is shown having a thigh portion 11, a knee area 12, a calf area 13, an ankle area 14 and a foot area 15. Positioned about the leg 10 is one form of measuring device 9 of this invention. The device 9 includes a substantially cylindrical sleeve 16 shown encircling the leg from its top 17, located above the knee 12, to its bottom 18, located near the middle of the foot. The sleeve 16 preferably has a binding (not shown) along the top 17 and the bottom 18 to prevent the threads of the sleeve material from unravelling. The sleeve 16 itself is preferably formed of a single piece of highly elastic material which is easily stretchable to encircle a body portion such as the leg as shown in FIG. 1. The sleeve 16 is advantageously smaller in girth than the body portion being measured to permit the sleeve to intimately conform thereto.

To prevent discomfort to the patient caused by, for example, ulceration of a leg, the elastic sleeve should be highly elastic and, as such, incapable of providing useful therapeutic support.

The sleeve should be constructed of a highly elastic material which is stretchable only in one direction, namely, in the circumferential direction. Longitudinal stretching of the sleeve 16 is undesirable because the device is designed specifically to measure the girth of the body at predetermined longitudinally disposed positions. If the sleeve were longitudinally stretchable, measurements taken with the device would lack longitudinal precision.

The sleeve 16 itself is advantageously formed by a single piece of circumferential elastic material substantially cylindrically shaped. For some applications, a tapered sleeve may be desirable, such sleeve would have a larger diameter opening at one end of the sleeve than the other. For other applications, the sleeve may be somewhat shaped itself to conform to an ankle, for example. The formed sleeves, however, are more expensive to manufacture and, as such, are not economically competitive with the disposable cylindrical sleeve.

Disposed longitudinally along the sleeve are a plurality of measuring tapes 19. Each measuring tape 19 is sewn at one end to the outer surface of the sleeve 16 and extends therefrom at an angle which is substantially perpendicular to the longitudinal direction of the cylindrical sleeve 16. However, the tapes need not be sewn at the end, e.g., alternatively, the tapes may be sewn to the sleeve by stitching located substantially midway between the tape ends. Furthermore, each measuring tape 19 preferably has a width which is smaller than the longitudinal spacing between two adjacent measuring tapes and has a length which is larger than the circumference of the body being measured at the given longitudinal location of the measuring tape.

Each measuring tape 19 is preferably provided with indicia 20, the indicia being used to determine the distance around the body at the associated longitudinal location. The indicia may be calibrated in centimeters, millimeters, inches or any other form of length calibration which is appropriate for use as a template to determine the circumference at a given point along the length of a fitted surgical bandage or support. While indicia-bearing tapes have been shown, blank measuring tapes, i.e., tapes without indicia, are equally useful as a measuring device. With blank tapes, the girth is marked on the tape and thereafter independently measured with a ruler or the like.

Each of the measuring tapes 19 is comprised of a non-stretchable flexible material such as cloth, tape, flexible cardboard, or other materials adapted to receive the indicia 20 which may be printed, painted or otherwise placed thereon and further adapted to be sewn to the elastic sleeve 16.

FIG. 2 shows an alternative embodiment of the present invention wherein a substantially cylindrical sleeve 16 is provided and extends from the knee to a position midway on the foot. The principal difference between the measuring apparatus in FIG. 2 and that of FIG. 1 is that the means for attaching the measuring tapes to the sleeve is somewhat different. In FIG. 2 the measuring tapes 21 are integrally formed with, or alternatively are sewn to, a longitudinal strip of material 22 which itself is secured to the outer surface of the elastic sleeve 16 by stitching or the like. The principal advantage of this construction is that the longitudinal strip 22 can be sewn to the sleeve as a unit, making individual positioning and sewing of the separate tapes 19 unnecessary, whereas the construction in FIG. 1 requires each measuring tape to be separately positioned and individually sewn at predetermined locations along the sleeve. Thus, the construction depicted in FIG. 2 readily lends itself to a simplified manufacturing, especially where the cylindrical sleeve 16 is of the non-tapered type and has a uniform cylindrical shape over the entire length of the sleeve.

In order to custom fit a surgical or therapeutic bandage, stocking, etc., to an individual, girth measurements must first be taken along the length of the body which is to be fitted with the bandage, stocking, or the like. Using the present measuring apparatus, the patient simply expands the sleeve to permit slipping it over the portion of the body which is to be measured. Because the sleeve is highly stretchable, not itself providing therapeutic support when on the body, the step of placing the sleeve on the body is easily done and without discomfort should the body portion be ulcerated or the like. Further, since the sleeve is stretchable in the circumferential direction only and smaller in girth than the body portion being measured, the sleeve will contract to intimately conform to the shape of the body over which the sleeve is placed. However, the measuring tapes displaced longitudinally along the sleeve will remain in a predetermined longitudinally spaced relationship after the sleeve has been positioned on the body since the sleeve is not stretchable longitudinally. Finally, since the measuring tapes extend from the sleeve in a direction which is substantially perpendicular to the longitudinal direction of the sleeve, each measuring tape is disposed for easy measurement of the body girth.

In order to determine the various contour or girth measurements necessary to produce an individually fitted therapeutic garment, the patient simply encircles the portions of the body being measured and over which the sleeve has been placed with the measuring tapes as shown at 25 in FIG. 1. The individual circumferences are taken by noting the amount of tape required to encircle the various portions of the body. Where the tapes are calibrated, the notation is indicated by one of many ways, such as by marking the tape with a pencil, pin, etc; by recording the measurement on a separate sheet of paper, or by cutting the overlapping tape portions. The recorded measurements, or the marked tapes and sleeve, as the case may be, are then sent to the manufacturing facility where they are used to fabricate the custom-fit garment.

If the tapes are blank, measurements can be noted by marking directly on the measuring tape with a pencil or pen such as shown by mark 26 of FIG. 1; removing the excessive, circumferentially overlapping portion of the measuring tape (see measuring tape 15 with cut edge 27); or placing a pin or paper clip on the tape at the point indicative of the encircling distance. When measuring tapes without indicia are used, after the measurements of body girth have been made by marking directly on the tape, cutting the tape or placing a pin or the like on the tape, the patient simply removes the sleeve from the body portion being measured and sends the sleeve with its marked measuring tapes there attached to the manufacturing facility where the measurement markings are used to manufacture the individually fitted surgical bandage or garment. Once the garment is manufactured, the elastic sleeve and attached measuring tape can be saved for future reference, or disposed of after having recorded the measurements.

A further modification includes an adhesive spot positioned on the longitudinal strip 22 at a point adjacent a transversely extending strip 21. The adhesive serves to secure a transversely extending strip 21 in its girth encircling position to further assist the measurement taking.

The foregoing description has been directly related to the primary intended use of the present taking of girth measurements of a body to permit the manufacture of a surgical or therapeutic device, such as a stocking that particularly conforms to the contours of that individual body. However, the measuring apparatus of the present invention does have application in other areas. For example, it is easily adaptable for use as a testing device to determine the time rate of swelling or contracting of a body extremity, such as a morning and evening measurement. Since the sleeve is made of an elastic material, a swelling or contracting body portion may be easily accommodated while, at the same time, a plurality of measuring tapes may remain at a predetermined and fixed longitudinal disposition along the body. Such an apparatus, consequently, is readily adaptable to measuring the body circumference at different times in order to determine the rate of swelling or contracting of such body portion. Another similarly related use of the present invention is to provide an apparatus adaptable to measuring the surface area of a body which may prove particularly useful for skin grafts and other surgical procedures.

While the foregoing description of the present invention has been made with particular attention to preferred embodiments thereof, it will be clear to those of skill in the art that certain modifications can readily be made which will fall within the spirit and scope of the following appended claims.

What is claimed is:

1. An apparatus for making multiple measurements of the girth of an elongated portion of the body along its length, comprising:

an elongated substantially cylindrical sleeve, said sleeve being fabricated of elastic material having an elasticity incapable of providing useful therapeutic support when placed in encircling relation to said body portion being measured, said sleeve having a diameter when unstretched which is less than the diameter of said body portion to be measured to enable said sleeve when placed about said body portion to intimately conform to the contour of the portion of the body being measured along its length and remain so positioned without manual intervention, and a plurality of longitudinally spaced measuring strips each attached at only one point thereof directly to the outer surface of said sleeve and dimensioned in length to completely encircle the associated body portion when placed thereabout, said strips having a constant length which resists extension under tension.

2. The apparatus of claim 1 wherein said elastic sleeve is constructed of an elastic material of the one-way stretch type, the sleeve being stretchable substantially in only a circumferential direction.

3. The apparatus in claim 1 wherein said measuring strips are equally spaced along said sleeve.

4. The apparatus in claim 1 wherein said measuring strip include calibration indicia thereon.

5. An apparatus for making multiple measurements of the girth of an elongated portion of the body along its length, comprising:

an elongated substantially cylindrical sleeve fabricated of elastic material having an elasticity incapable of providing useful therapeutic support when placed in encircling relation to said body portion being measured, said sleeve having a diameter when unstretched which is less than the diameter of said body portion to be measured to enable said sleeve when placed about said body portion to intimately conform to the contour of the portion of the body being measured along its length and remain so positioned without manual intervention, a tape directly secured to the outer surface of said sleeve along a line parallel to the axis of said sleeve, and a plurality of measuring strips each attached at only one point thereof to said tape, said strips extending transversely from said tape and dimensioned in length to completely encircle the associated body portion when placed thereabout, said strips having a constant length which resists extension under tension.

6. The apparatus in claim 5 wherein each said measuring strip is integrally formed with said tape.

* * * * *